(12) United States Patent
Chin et al.

(10) Patent No.: US 12,436,190 B2
(45) Date of Patent: Oct. 7, 2025

(54) FUNCTIONAL TESTING DEVICE

(71) Applicants: INVENTEC (PUDONG) TECHNOLOGY CORPORATION, Shanghai (CN); INVENTEC CORPORATION, Taipei (TW)

(72) Inventors: Chih-Jen Chin, Taipei (TW); Cheng-Hung Wu, Taipei (TW); Yi-Ping Yang, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 34 days.

(21) Appl. No.: 18/532,863

(22) Filed: Dec. 7, 2023

(65) Prior Publication Data
US 2025/0085342 A1    Mar. 13, 2025

(30) Foreign Application Priority Data

Sep. 12, 2023 (CN) .......................... 202311175177.0

(51) Int. Cl.
G06F 11/00      (2006.01)
G01R 31/317     (2006.01)

(52) U.S. Cl.
CPC . *G01R 31/31712* (2013.01); *G01R 31/31721* (2013.01)

(58) Field of Classification Search
CPC ............ G06F 11/3688; G06F 11/3684; G06F 11/3672; G06F 11/3698; G06F 11/3485; G06F 11/2221; G06F 11/2294
See application file for complete search history.

(56) References Cited

U.S. PATENT DOCUMENTS

| | | | | |
|---|---|---|---|---|
| 7,913,002 B2* | 3/2011 | Washizu | ............... | G06F 11/273 714/724 |
| 8,902,607 B1* | 12/2014 | Chang | ........................ | G06F 1/16 361/679.01 |
| 9,958,497 B2* | 5/2018 | Sharf | .................... | H01R 13/717 |
| 2005/0119872 A1* | 6/2005 | Nakaya | ............ | G01R 31/31905 703/23 |
| 2021/0270888 A1* | 9/2021 | Treon | ..................... | G01R 29/02 |

* cited by examiner

Primary Examiner — Charles Ehne
(74) Attorney, Agent, or Firm — Maschoff Brennan

(57) ABSTRACT

A functional testing device includes a substrate, an input/output module, a plurality of functional testing modules, a baseboard management control module and a power module. The input/output module is disposed on the substrate and configured to receive a test script. The plurality of functional testing modules are pluggably disposed on the substrate. The baseboard management control module is disposed on the substrate and connected to the input/output module and the plurality of functional testing modules, the baseboard management control module is configured to control the plurality of functional testing modules output a plurality of testing signals according to the test script. The power module is disposed on the substrate and configured to receive and transmit power to the plurality of functional testing modules and the baseboard management control module.

9 Claims, 17 Drawing Sheets

FUNCTIONAL TESTING DEVICE

CROSS-REFERENCE TO RELATED APPLICATIONS

This non-provisional application claims priority under 35 U.S.C. § 119(a) on Patent Application No(s). 202311175177.0 filed in China on Sep. 12, 2023, the entire contents of which are hereby incorporated by reference.

BACKGROUND

1. Technical Field

This disclosure relates to a functional testing device.

2. Related Art

In server product manufacturing, the test function station that performs function board test (FBT) is the last product verification station. The production process and product function may be confirmed through the test function station. The operation of the test function station mainly works by the operator connecting various components required on the server motherboard or peripheral function cards to the connectors of the test function station for testing.

The current test machine needs to use a real motherboard for testing, and the motherboard needs to be booted and enter the operating system before testing, and only one server motherboard or peripheral function card can be tested at a time. Not only does the testing time and cost are high, for the increasing demand for server motherboards or peripheral function cards, this makes it impossible to achieve a balance between supply and demand.

SUMMARY

Accordingly, this disclosure provides a functional testing device.

A functional testing device includes a substrate, an input/output module, a plurality of functional testing modules, a baseboard management control module and a power module. The input/output module is disposed on the substrate and configured to receive a test script. The plurality of functional testing modules are pluggably disposed on the substrate. The baseboard management control module is disposed on the substrate and connected to the input/output module and the plurality of functional testing modules, the baseboard management control module is configured to control the plurality of functional testing modules output a plurality of testing signals according to the test script. The power module is disposed on the substrate and configured to receive and transmit power to the plurality of functional testing modules and the baseboard management control module.

In view of the above description, the functional testing device according to one or more embodiments of the present disclosure may perform various tests on one or more devices under test at the same time, thereby reducing time required to performing testing. In addition, the functional testing device according to one or more embodiments of the present disclosure may not require to perform testing through a mother board, testing cost may be reduced.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

The functional testing device, system and method disclosed by the following one or more embodiments may be adapted to a function board test (FBT) station for testing the motherboard and peripheral function cards, especially for server motherboard and peripheral function cards.

Figure 1:
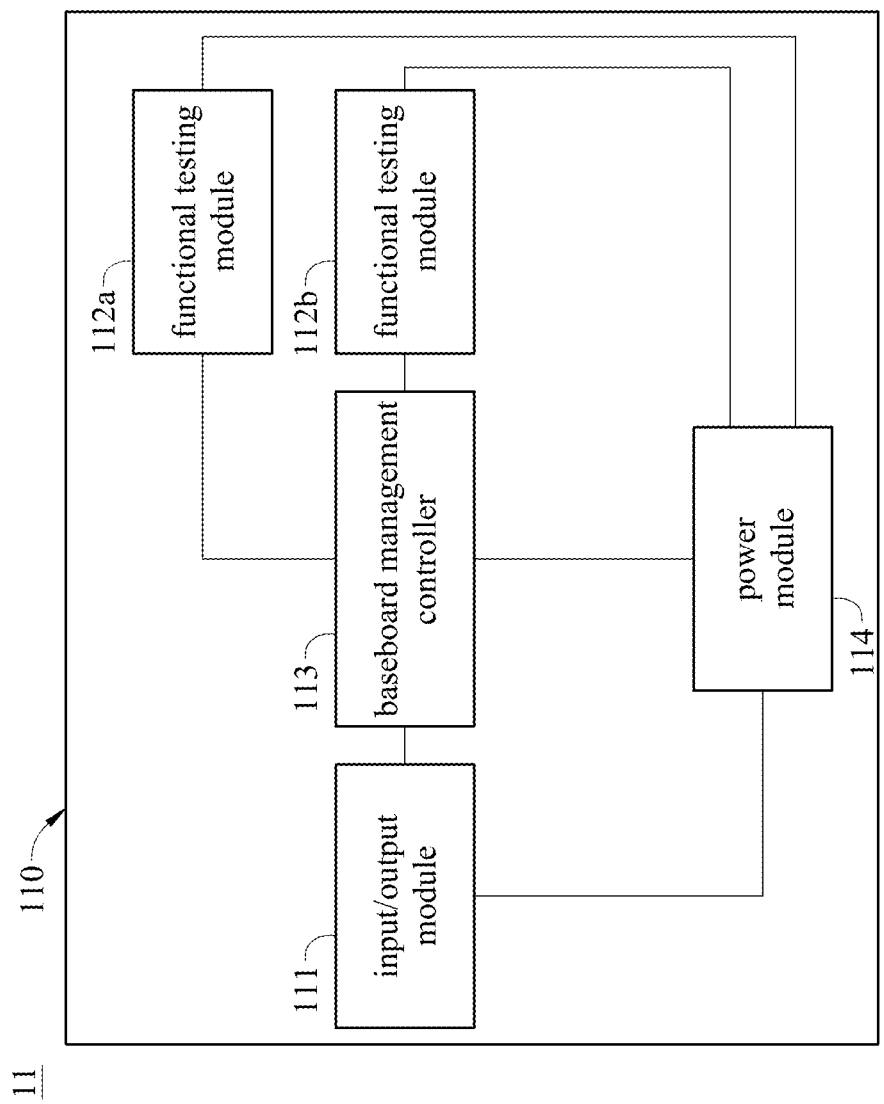
FIG. 1 is a block diagram illustrating a functional testing device according to an embodiment of the present disclosure.

Please refer to FIG. 1, wherein FIG. 1 is a block diagram illustrating a functional testing device according to an embodiment of the present disclosure. As shown in FIG. 1, a functional testing device 11 includes a substrate 110, an input/output module 111, a plurality of functional testing modules 112a and 112b, a baseboard management control (BMC) module 113 and a power module 114. FIG. 1 exemplarily shows two functional testing modules, but the present disclosure does not limit the number of the functional testing modules. The input/output module 111, the BMC module 113 and the power module 114 are disposed on the substrate 110, and the functional testing modules 112a and 112b are pluggably disposed on the substrate 110. The functional testing modules 112a and 112b may have different test functions, and each one of the functional testing modules 112a and 112b may perform one or more testing items. For example, the functional testing modules 112a and 112b may be disposed on the substrate 110 through peripheral component interconnect express (PCIe) connection ports. The specification of each one of the functional testing modules 112a and 112b may be half-height half-length (HHHL) or full-height half-length (FHHL). The BMC module 113 is connected to the input/output module 111, the functional testing modules 112a and 112b and the power module 114.

The input/output module 111 may include one or more communication ports configured to access a test script. In other words, the input/output module 111 is configured to receive the test script. Specifically, the input/output module 111 may be in communication connection with a user interface to receive the test script input by the user, and/or the input/output module 111 may be in communication connection with a database server to obtain the test script, wherein said communication connection may be wired connection or wireless connection. The test script may indicate the testing item and the corresponding testing procedure, which includes order of multiple testing items performed by the functional testing modules 112a and 112b. The power module 114 is configured to receive and transmit power to the functional testing modules 112a and 112b and the BMC module 113. Furthermore, the power module 114 may further transmit power to a device under test.

The BMC module 113 may include a baseboard management controller (BMC) and a memory, wherein an embedded memory of the BMC may pre-store testing commands corresponding to the testing items of the functional testing modules 112a and 112b, and the memory may be configured to store the test script. Specifically, the embedded memory may be a nonvolatile memory such as an embedded multimedia card (eMMC) etc., the memory may be a volatile memory such as a double data rate fourth generation (DDR4) synchronous dynamic random-access memory etc. The BMC module 113 is configured to control the functional testing modules 112a and 112b to output a plurality of testing signals according to the test script, wherein the testing signals may be output to the device under test. The BMC module 113 may further obtain a response signal of the device under test responding to the testing signal through the functional testing modules 112a and 112b, and generate a pass result or a fail result according to the response signal.

After the input/output module 111 receiving the test script, the BMC of the BMC module 113 may store the test script into the memory of the BMC, read the test script stored in the memory when the test is performed (or about to be performed), and use at least a part of the testing commands stored in the embedded memory of the BMC according to the read test script to control the functional testing modules 112a and 112b outputting the testing signals.

For example, the testing items may include PCIe testing item. The PCIe testing item may include testing one or more of transmission speed and width of a link, link speed change, data transmission performance, receiver lane margin, receiver eye diagram, packet generator and error injection. The BMC module 113 may obtain the response signals of PCIe responding to the testing items listed above through the functional testing modules 112a and 112b, and generate a test result accordingly.

In addition, the input/output module 111 may be further configured to obtain identification information of the device under test. The BMC of the BMC module 113 requests the test script corresponding to the identification information from the database server through the input/output module 111, and then stores the test script into the memory of the BMC. A read-only memory (ROM) of the device under test may store the identification information of the device under test, the input/output module 111 may obtain the identification information by reading the read-only memory of the device under test directly. The identification information may be the name and/or serial number etc. of the device under test, the present disclosure is not limited thereto.

Figure 2:
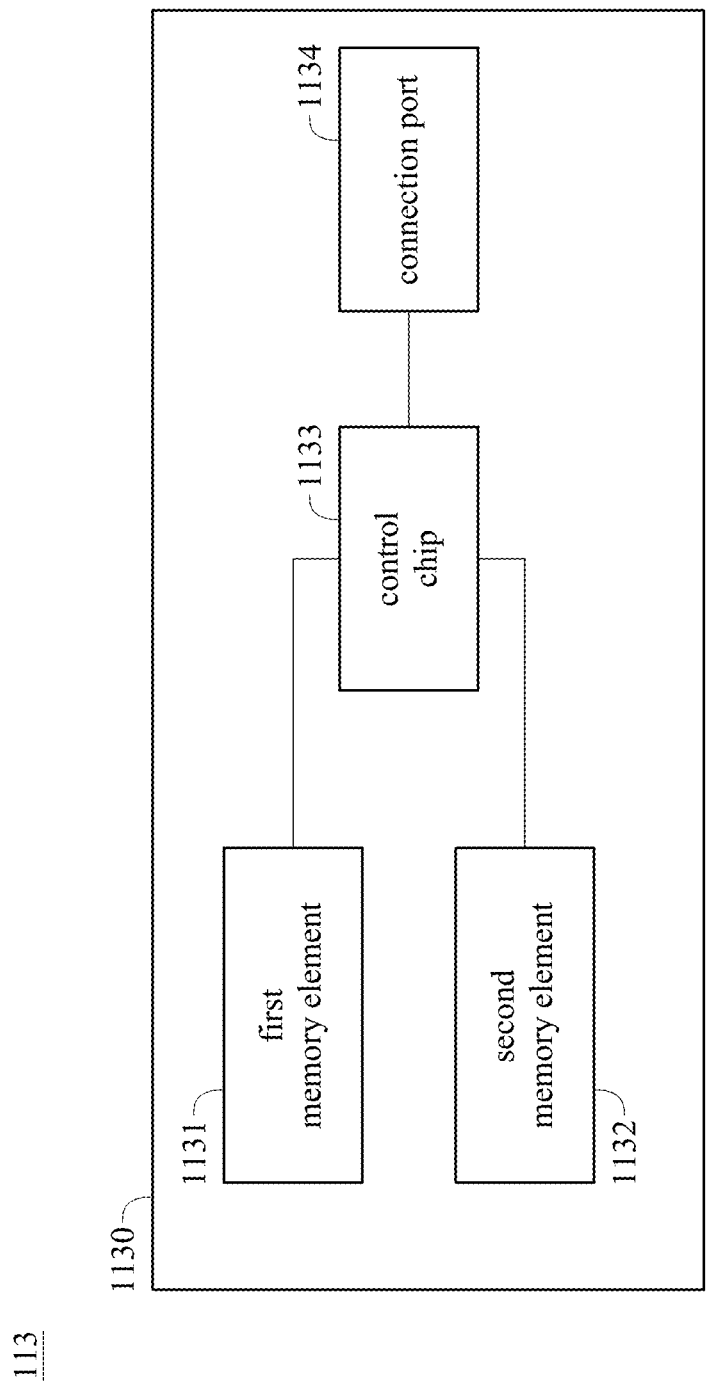
FIG. 2 is a block diagram illustrating a baseboard management control module according to an embodiment of the present disclosure.

Please refer to FIG. 1 and FIG. 2, wherein FIG. 2 is a block diagram illustrating a baseboard management control module according to an embodiment of the present disclosure. As shown in FIG. 2, the BMC module 113 may include an expansion board 1130, a first memory element 1131, a second memory element 1132, a control chip 1133 and a connection port 1134, wherein the first memory element 1131, the second memory element 1132, the control chip 1133 and the connection port 1134 are disposed at the expansion board 1130. Specifically, the first memory element 1131 may be the memory storing the test script as described above, the second memory element 1132 may be the memory storing the testing commands corresponding to the testing items as described above, and the control chip 1133 may be a chip running baseboard management control (RunBMC). The control chip 1133 may be connected to circuit(s) on the substrate 110 through the connection port 1134. The connection port 1134 may be, for example, a dual in-line memory module (DIMM) interface. In other words, the BMC module 113 may be pluggably connected to the substrate 110. In another embodiment, the BMC module 113 may also include the first memory element 1131, the second memory element 1132 and the control chip 1133 that are directly disposed on the substrate 110.

Figure 3:
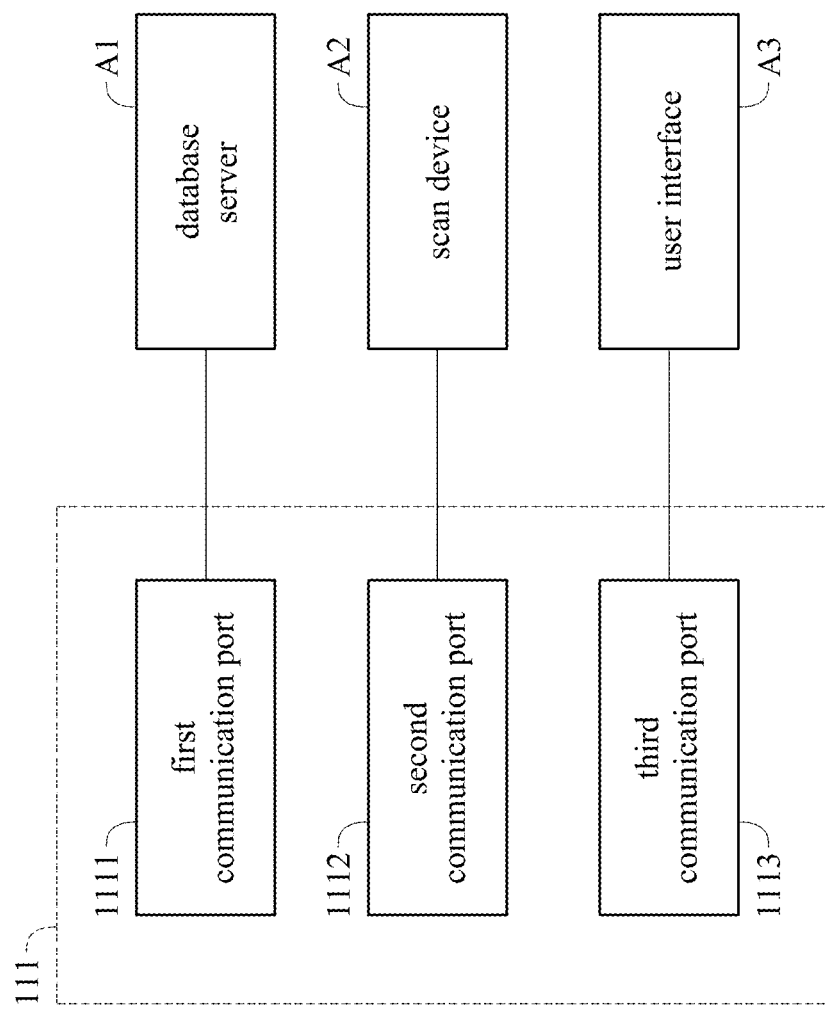
FIG. 3 is a block diagram illustrating an input/output module according to an embodiment of the present disclosure.

Please refer to FIG. 1 to FIG. 3, wherein FIG. 3 is a block diagram illustrating an input/output module according to an embodiment of the present disclosure. As shown in FIG. 3, the input/output module 111 may include a first communication port 1111, a second communication port 1112 and a third communication port 1113. The first communication port 1111 is configured to connect the database server A1, the second communication port 1112 is configured to connect a scan device A2, and the third communication port 1113 is configured to connect the user interface A3. For example, the first communication port 1111 may be RJ45, the second communication port 1112 may be a universal serial bus (USB) interface. The third communication port 1113 may be one of a USB interface, RS232 and RS485. The embodiment of FIG. 3 only exemplarily illustrates three types of communication ports, but in other embodiments, the functional testing device 11 may include one or two types of the three types of communication ports, and the number of the communication port of each type is not limited thereto.

The database server A1 may be a cloud database server storing a plurality of test scripts corresponding to different devices under test, respectively. The scan device A2 may be a barcode scanner. The scan device A2 may be configured to scan a barcode on the device under test to obtain the identification information described above. The user interface A3 may be a keyboard, a mouse or a touch screen etc., and is configured to receive information input by the user.

The BMC module 113 may request the test script corresponding to the identification information (i.e. corresponding to the device under test) from the database server A1 through the first communication port 1111 according to the identification information. In addition, the third communication port 1113 may also be configured to receive the test script from the user interface A3. In other words, the input/output module 111 may include both the first communication port 1111 and the third communication port 1113, the input/output module 111 may also only include one of the first communication port 1111 and the third communication port 1113.

Figure 4:
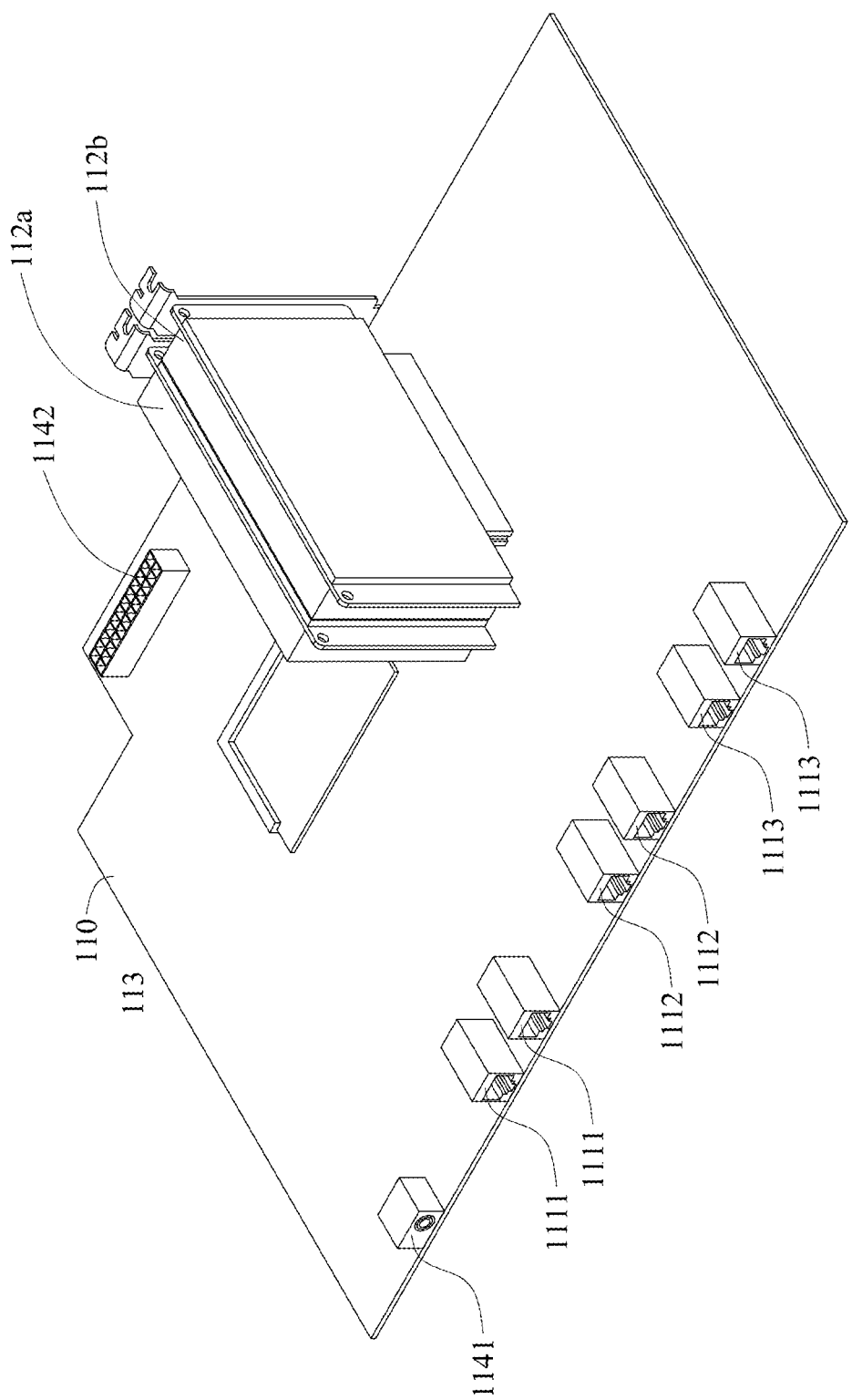
FIG. 4 is a three-dimensional schematic diagram of a functional testing device according to an embodiment of the present disclosure.
Figure 5:
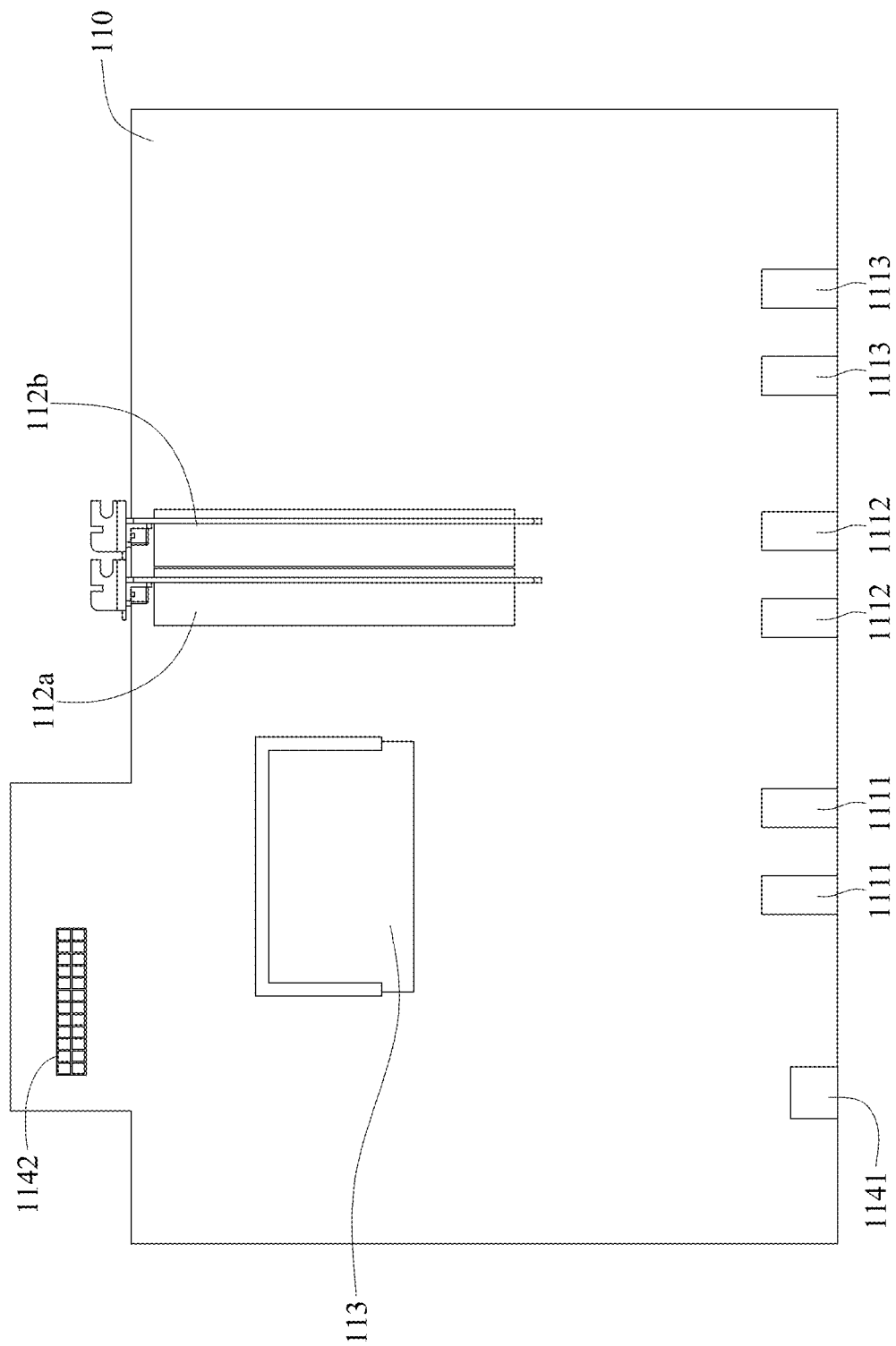
FIG. 5 is a top view of the functional testing device of FIG. 4.

Please refer to FIG. 4 and FIG. 5, wherein FIG. 4 is a three-dimensional schematic diagram of a functional testing device according to an embodiment of the present disclosure, and FIG. 5 is a top view of the functional testing device of FIG. 4. The substrate 110, the input/output module 111, the functional testing modules 112a and 112b, the BMC module 113 and the power module 114 shown in FIG. 1 to FIG. 3 may be disposed in the same manner as shown in FIG. 4 and FIG. 5. In addition, the power module 114 may include a power input port 1141 and a power output port 1142. The power input port 1141 is configured to receive power from an external power source to provide power to the modules on the substrate 110, and to output power to the device under test through the power output port 1142.

Figure 6:
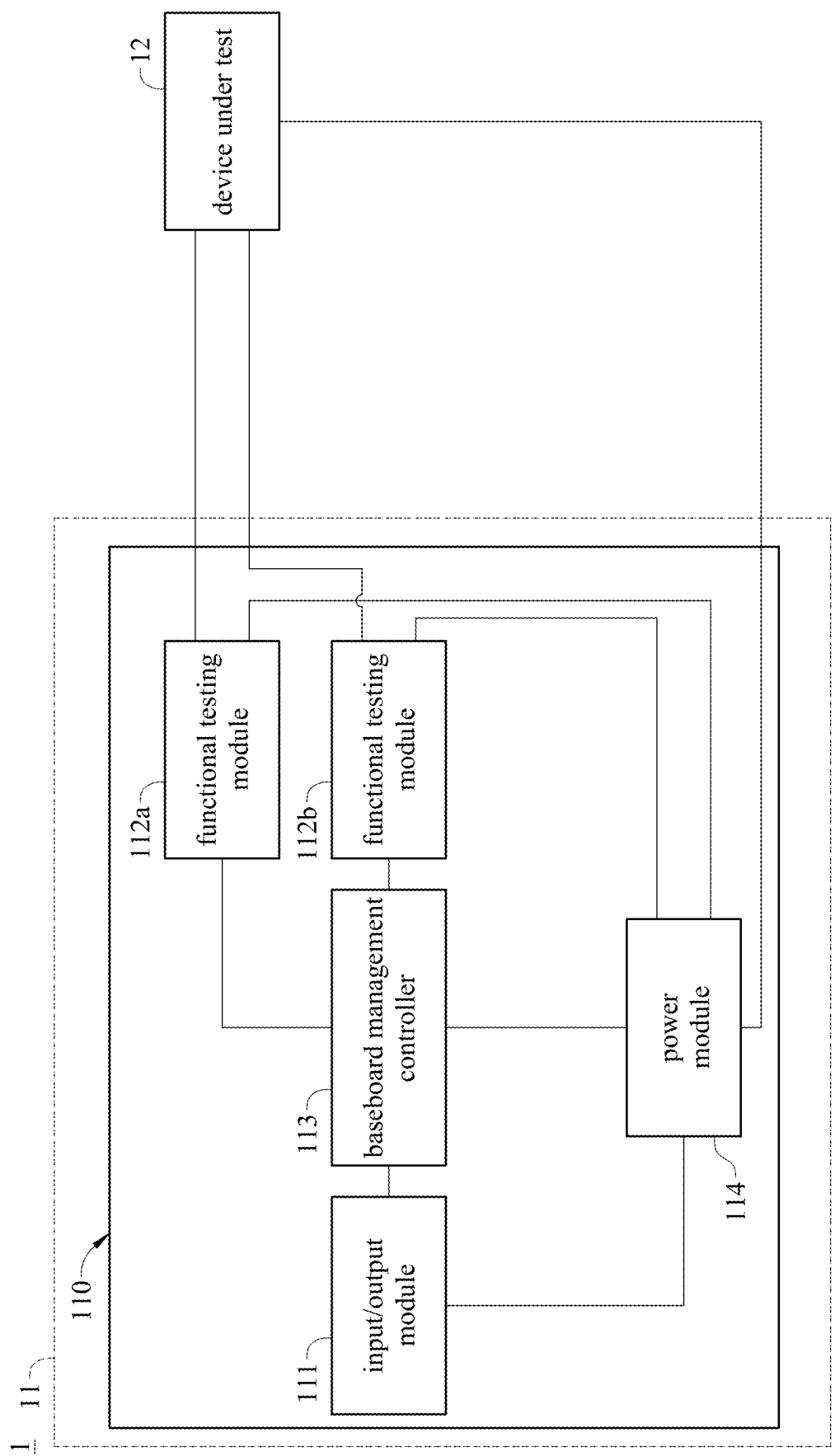
FIG. 6 is a block diagram illustrating a functional testing system according to an embodiment of the present disclosure.

Please refer to FIG. 6, wherein FIG. 6 is a block diagram illustrating a functional testing system according to an embodiment of the present disclosure. As shown in FIG. 6, the functional testing system 1 includes the functional testing device 11 and the device under test 12 as shown in FIG. 1. The functional testing modules 112a and 112b are pluggably disposed on the substrate 110 and pluggably connected to the device under test 12. The device under test 12 is connected to the power module 114. The power module 114 is configured to receive and output power to the device under test 12. The input/output module 111 is configured to receive test scripts corresponding to the device under test 12. The BMC module 113 is configured to perform testing on the device under test 12 according to the test scripts through the functional testing modules 112a and 112b. In other words, the BMC module 113 controls the functional testing modules 112a and 112b to output the testing signals to the device under test 12 according to the test scripts.

Figure 7:
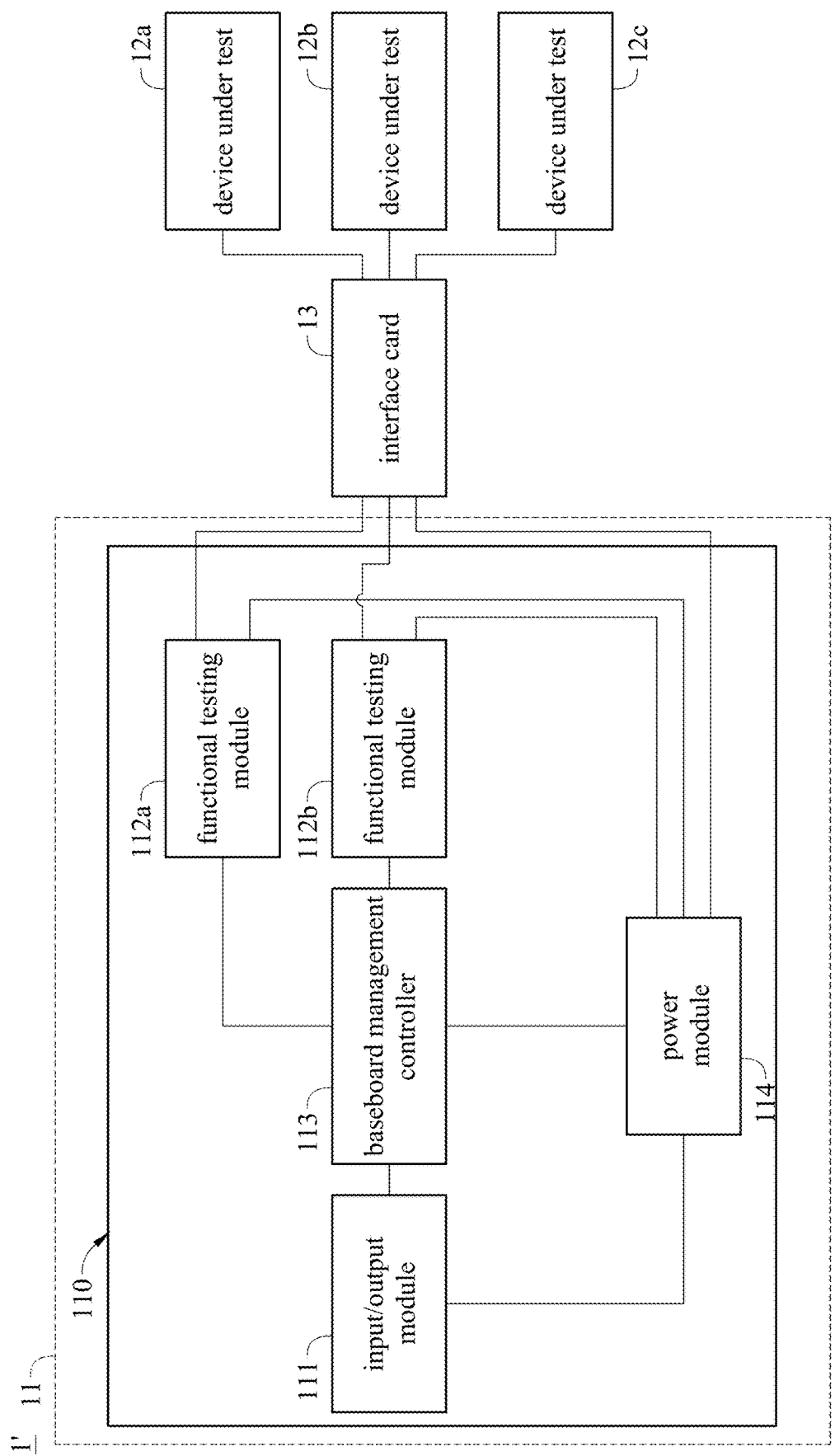
FIG. 7 is a block diagram illustrating a functional testing system according to another embodiment of the present disclosure.

Please refer to FIG. 7, wherein FIG. 7 is a block diagram illustrating a functional testing system according to another embodiment of the present disclosure. As shown in FIG. 7, the functional testing system 1' includes the functional testing device 11 as shown in FIG. 1, a plurality of devices under test 12a to 12c and an interface card 13. The numbers of the functional testing modules and the devices under test shown in FIG. 7 are only examples, the number of the functional testing modules may be more than 2, and the number of the devices under test may be between 1 to 3, the number of the devices under test may also be more than 3. For example, each one of the devices under test 12a to 12c may include the nonvolatile memory storing the identification information. The interface card 13 is configured to connect the functional testing modules 112a and 112b to the devices under test 12a to 12c. The functional testing modules 112a and 112b may be connected to the interface card 13 through a mini cool edge I/O (MCIO) transmission line. Specifically, in the structure of FIG. 3, the interface card 13 may be configured to transmit power output by the power module 114 and the testing signals output by the functional testing modules 112a and 112b to the devices under test 12a to 12c.

Figure 8A:
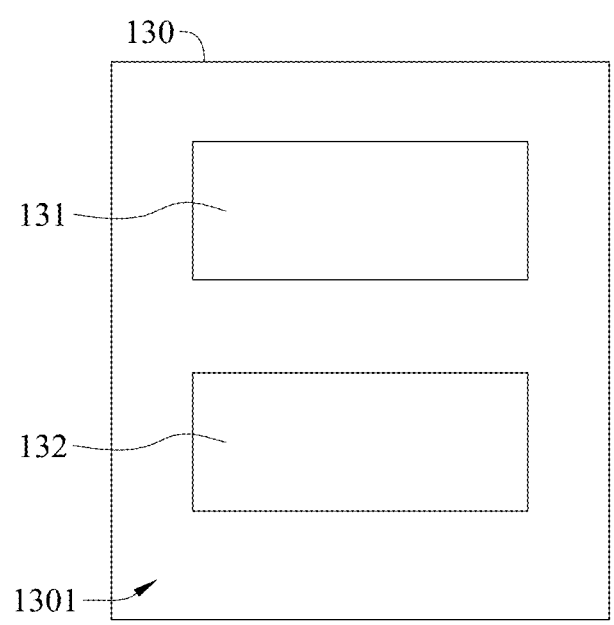
FIG. 8A is a block diagram illustrating a shell, a power signal input port and a testing signal input port of an interface card according to an embodiment of the present disclosure.
Figure 8B:
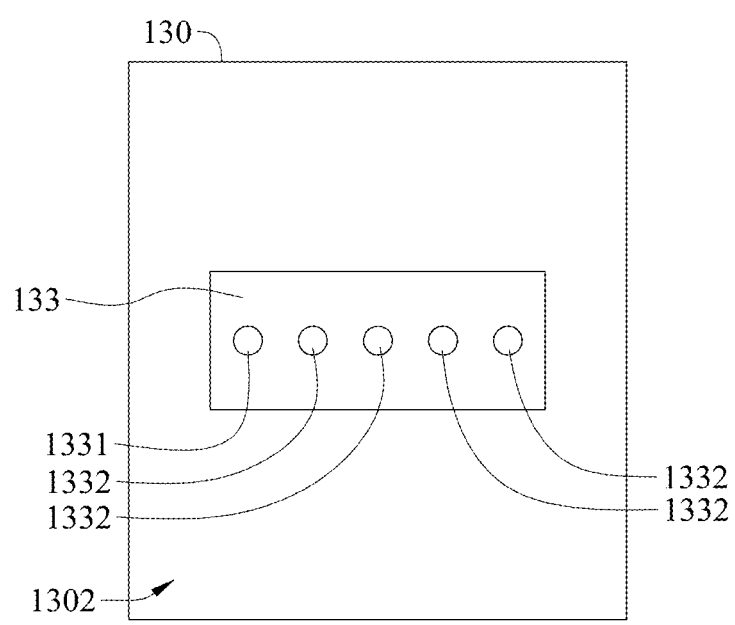
FIG. 8B is a block diagram illustrating a signal output port of the interface card according to an embodiment of the present disclosure.

Please refer to FIG. 7, FIG. 8A and FIG. 8B, wherein FIG. 8A is a block diagram illustrating a shell, a power signal input port and a testing signal input port of an interface card according to an embodiment of the present disclosure, and FIG. 8B is a block diagram illustrating a signal output port of the interface card according to an embodiment of the present disclosure. As shown in FIG. 8A and FIG. 8B, the interface card 13 has a shell 130, a power signal input port 131, one or more testing signal input ports 132 and one or more signal output ports 133. The signal output port 133 includes a power signal sub-port 1331 corresponding to the power signal input port 131 and one or more testing signal sub-ports 1332 corresponding to the testing signal input port 132. The power signal input port 131 is electrically connected to the power module 114 and the power signal sub-port 1331. The testing signal input port 132 is electrically connected to the testing signal sub-ports 1332 and the functional testing modules 112a and 112b. Specifically, the power signal input port 131 and the testing signal input port 132 may be disposed at a first surface 1301 of the shell 130, and the signal output port 133 may be disposed at a second surface 1302 of the interface card 13. More specifically, the second surface 1302 may be opposite to the first surface 1301. The signal output port 133 may be connected to the device under test through wire(s). FIG. 8A and FIG. 8B exemplarily shows locations of the power signal input port 131, the testing signal input port 132 and the signal output port 133 of the interface card, but the locations where the power signal input port 131, the testing signal input port 132 and the signal output port 133 are disposed are not limited thereto.

The power signal input port 131 is configured to receive power from the power module 114 and output the power to the devices under test 12a to 12c through the power signal sub-port 1331. The testing signal input port 132 is configured to receive the testing signals from the functional testing modules 112a and 112b and output the testing signals to the devices under test 12a to 12c through the testing signal sub-ports 1332. In the embodiment of FIG. 8A and FIG. 8B, one testing signal input port 132 may be configured to receive the testing signal of one of the functional testing modules 112a and 112b, or one testing signal input port 132 may be configured to receive the testing signals of both the functional testing modules 112a and 112b; one signal output port 133 may be configured to output power and the testing signal(s) to one or more of the devices under test 12a to 12c, or one signal output port 133 may be configured to output power and the testing signal(s) to each one of the devices under test 12a to 12c.

Figure 9:
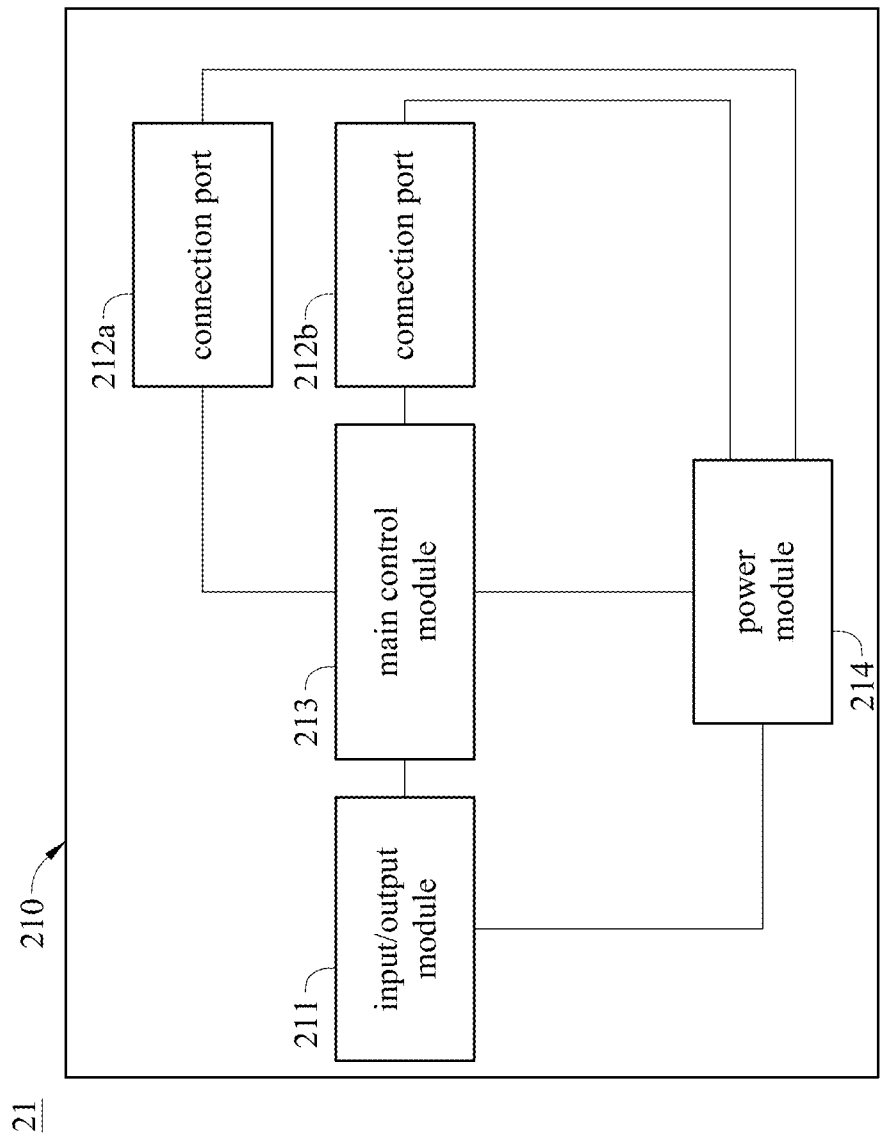
FIG. 9 is a block diagram illustrating a functional testing device according to another embodiment of the present disclosure.

Please refer to FIG. 9, wherein FIG. 9 is a block diagram illustrating a functional testing device according to another embodiment of the present disclosure. As shown in FIG. 9, the functional testing device 21 includes a substrate 210, an input/output module 211, a plurality of connection ports 212a and 212b, a main control module 213 and a power module 214. FIG. 9 exemplarily shows two connection ports, but the present disclosure does not limit the number of the connection port. The substrate 210 and the input/output module 211 of the functional testing device 21 may be the same as the substrate 110 and the input/output module 111 in the embodiments of FIG. 1 to FIG. 8A and FIG. 8B, their details are not repeated herein.

The connection ports 212a and 212b and the main control module 213 are disposed on the substrate 210, and the main control module 213 is connected to the connection ports 212a and 212b. The main control module 213 is configured to output a plurality of testing signals to the connection ports 212a and 212b according to the test script received by the input/output module 211. Further, the connection ports 212a and 212b may be PCIe connection ports configured to connect the device(s) under test, respectively.

Figure 10:
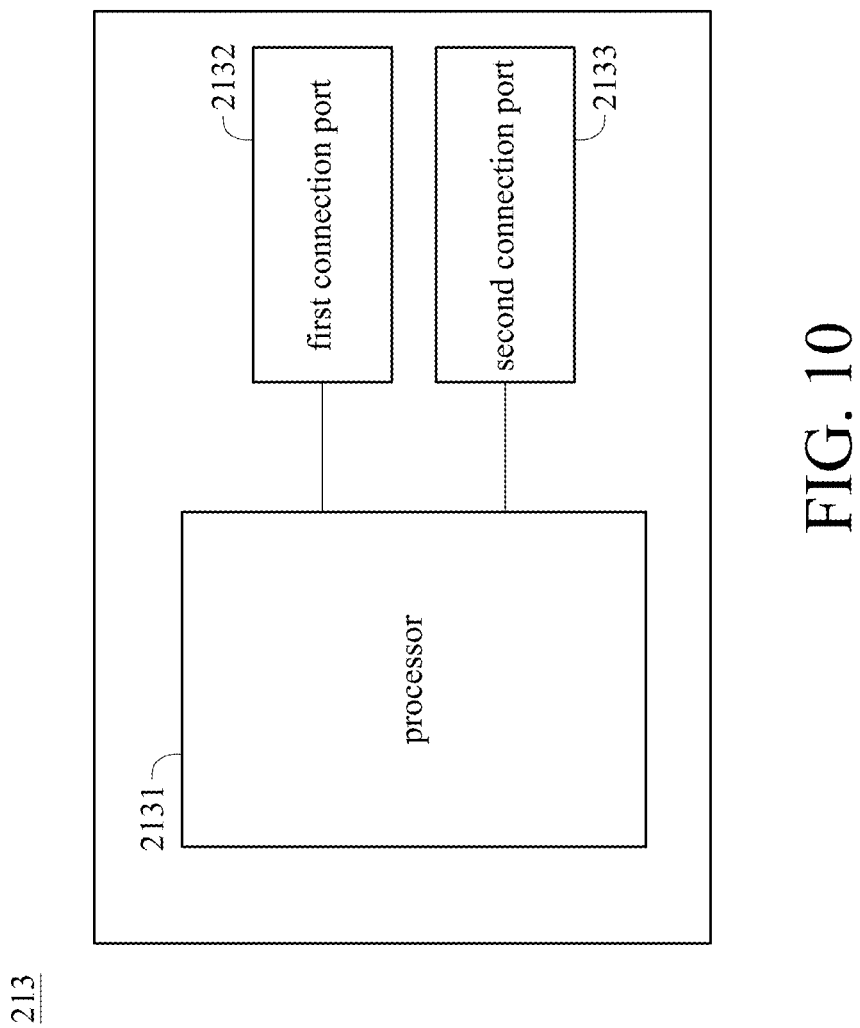
FIG. 10 is a block diagram illustrating a main control module according to an embodiment of the present disclosure.

Please refer to FIG. 9 and FIG. 10, wherein FIG. 10 is a block diagram illustrating a main control module according to an embodiment of the present disclosure. As shown in FIG. 10, the main control module 213 includes a processor 2131, a first connection port 2132 and a second connection port 2133. The processor 2131 is connected to the first connection port 2132 and the second connection port 2133. FIG. 10 exemplarily shows two connection ports, but the present disclosure does not limit the number of the connection ports. The first connection port 2132 may be a PCIe connection port, and the second connection port 2133 may be RJ45.

Figure 11:
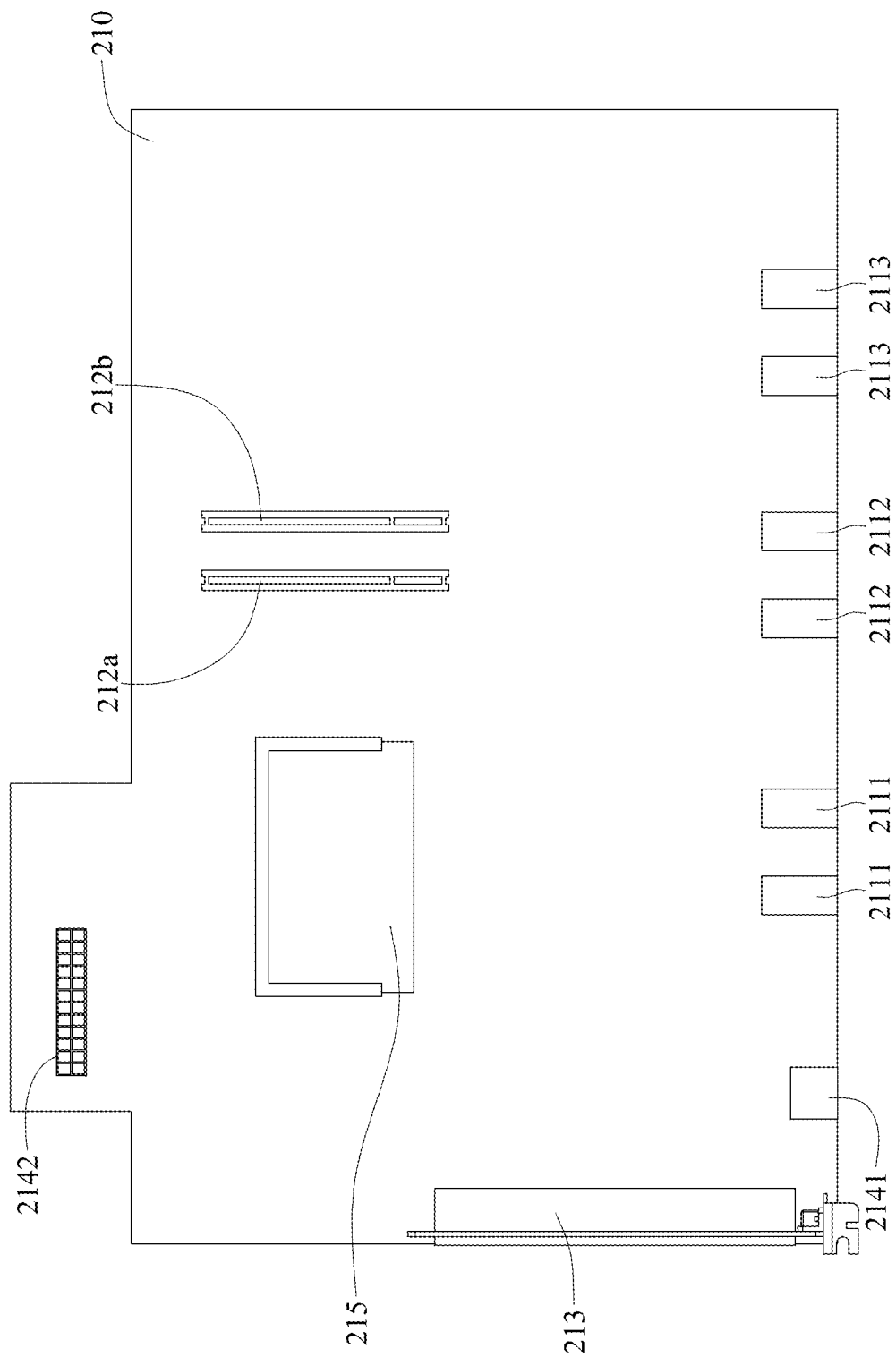
FIG. 11 is a schematic diagram illustrating the functional testing device of FIG. 9.

Please refer to FIG. 9 to FIG. 11, wherein FIG. 11 is a schematic diagram illustrating the functional testing device of FIG. 9. As shown in FIG. 11, the input/output module 211 includes a first communication port 2111, a second communication port 2112 and a third communication port 2113. The power module 214 includes a power input port 2141 and a power output port 2142, wherein the first communication port 2111, the second communication port 2112 and the third communication port 2113 may be the same as the first communication port 1111, the second communication port 1112 and the third communication port 1113 shown in FIG. 3 to FIG. 5, and the power input port 2141 and the power output port 2142 may be the same as the power input port 1141 and the power output port 1142 shown in FIG. 4 and FIG. 5.

Further, the power module 214 may include the power input port 2141, the power input port 2141 is configured to receive power from external power source, provide power to the main control module 213, and provide power to the device under test through the connection ports 212a and 212b.

In addition, the functional testing device 21 may also be connected to the device under test in the manner shown in one or more embodiments of FIG. 6 to FIGS. 8A and 8B. In this implementation, the connection ports 212a and 212b are configured to connect the functional testing module, and the power module 214 further includes the power output port 2142 and is configured to output power to the device under test.

In the functional testing device 21, the main control module 213 may be a module with a central processing unit (CPU) as the main computing element and connected to circuits on the substrate 210 through the PCIe connection port (the first connection port 2132). In one embodiment, the main control module 213 may be a module with a BMC as the main computing element and connected to circuits on the substrate 210 through the PCIe connection port (the first connection port 2132). In addition, the functional testing device 21 may further include an auxiliary module 215 disposed on the substrate 210, and the auxiliary module 215 may be the BMC module. The implementation of the BMC module may be the same as the embodiment of FIG. 2.

In addition, the main control module 213 may have the first connection port 2132, and the auxiliary module 215 may have another communication port configured to obtain the test script, wherein the communication port of the auxiliary module 215 may also be RJ45. The main control module 213 may output the testing signals to one of the connection ports 212a and 212b according to a part of the test script. The auxiliary module 215 may output the testing signals to the other one of the connection ports 212a and 212b according to the other part of the test script. In other words, the test script may indicate the tests to be performed by the main control module 213 and the auxiliary module 215, respectively. The main control module 213 and the auxiliary module 215 may obtain the same test script, and each one of the main control module 213 and the auxiliary module 215 determines the testing signal(s) to be output through the connection ports 212a and 212b.

Figure 12:
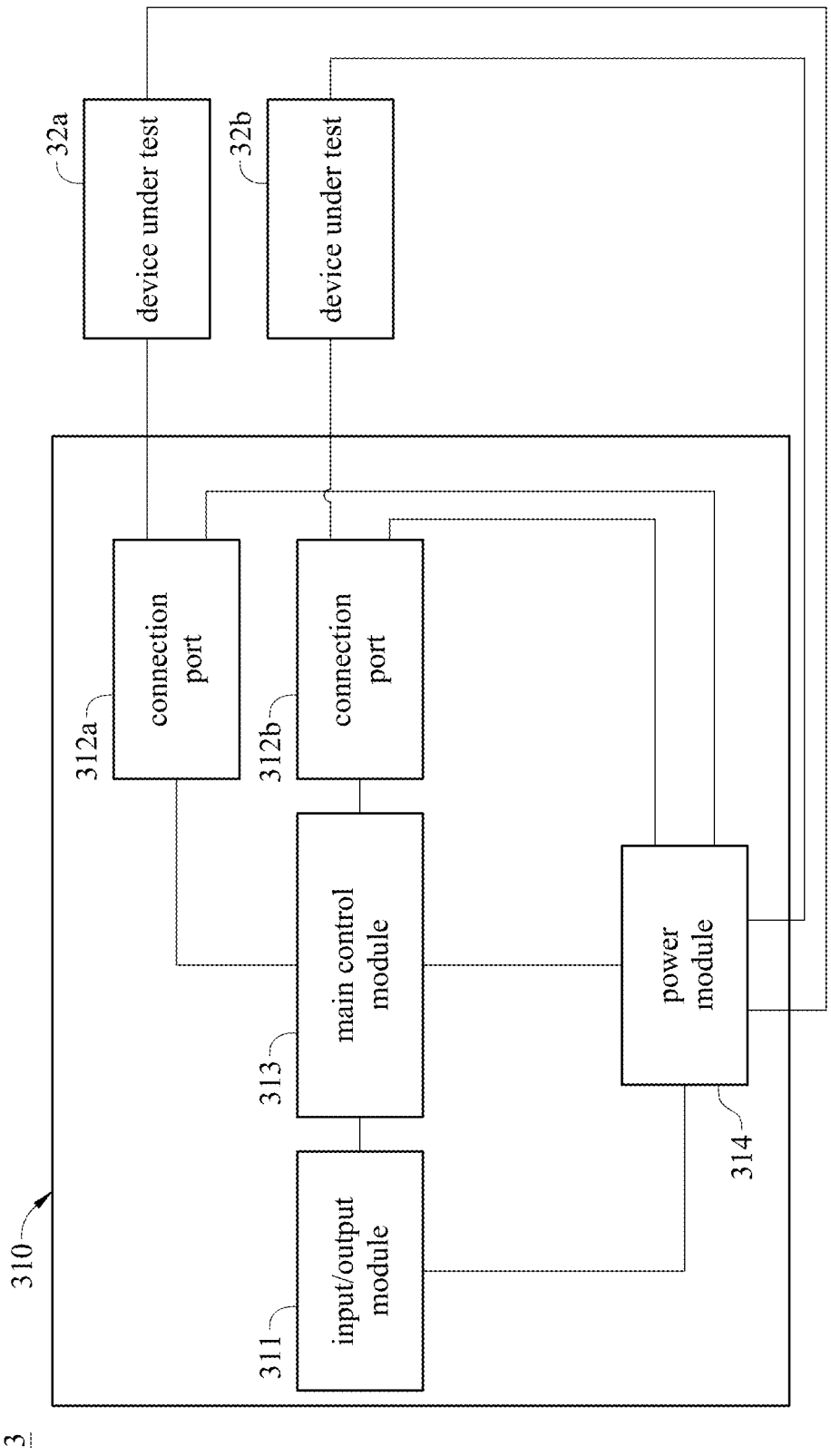
FIG. 12 is a block diagram illustrating a functional testing device according to yet another embodiment of the present disclosure.

Please refer to FIG. 12, wherein FIG. 12 is a block diagram illustrating a functional testing device according to yet another embodiment of the present disclosure. As shown in FIG. 12, the functional testing system 3 includes a substrate 310, an input/output module 311, a plurality of connection ports 312a and 312b, a main control module 313 and a plurality of devices under test 32a and 32b. The substrate 310, the input/output module 311, the connection ports 312a and 312b and the main control module 313 of the functional testing system 3 may be the same as the substrate 210, the input/output module 211, the connection ports 212a and 212b and the main control module 213 of the embodiments of FIG. 9 to FIG. 11, the same descriptions are not repeated herein. In addition, the functional testing system 3 may further include an auxiliary module, wherein the implementation of the auxiliary module may be the same as that of the embodiment of FIG. 11.

As shown in FIG. 12, the device under test 32a is connected to the connection port 312a, the device under test 32b is connected to the connection port 312b, wherein the device under test 32a and the device under test 32b may be the same device or different devices. As descried above, the main control module 313 may be a CPU configured to output the testing signals to the connection ports 312a and 312b according to the test script, so that the connection ports 312a and 312b output the testing signals to the devices under test 32a and 32b, respectively.

The functional testing system 3 may further include an auxiliary module, wherein the implementation of the auxiliary module may be the same as that of the embodiment of FIG. 11 (the auxiliary module 215). In other words, the auxiliary module of the functional testing system 3 may be the BMC module, the main control module 313 and the auxiliary module correspond to one communication port (for example, RJ45) of the input/output module 311, respectively, and the main control module 313 (as well as the auxiliary module) is configured to obtain the test script; and the main control module 313 and the auxiliary module may output the testing signals to the connection ports 312a and 312b according to the test script, respectively.

In addition, the device under test tested by the main control module 313 may be one or more of a network interface card (NIC) and a graphics processing unit (GPU) card; the device under test tested by the auxiliary module may be a device that does not have an active element, such as a riser card. In other words, the main control module 313 is configured to test the device under test 32a, the auxiliary module is configured to test the device under test 32*b*, and the device under test 32*b* does not have an active element.

Figure 13:
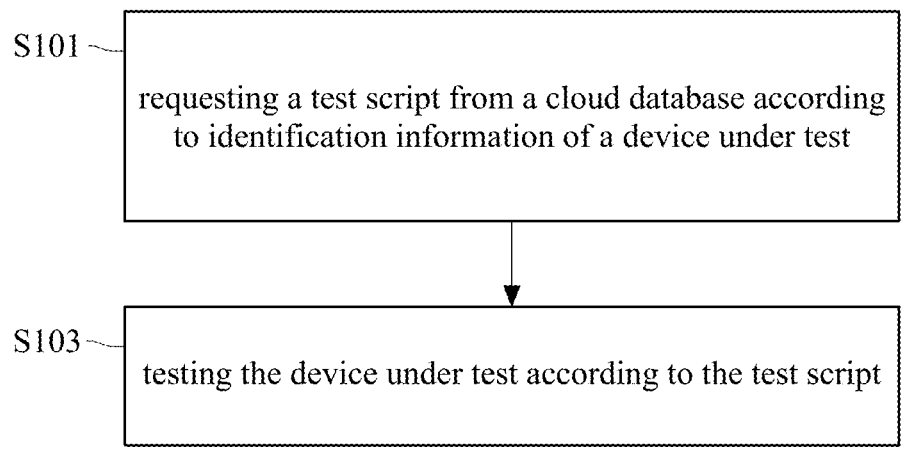
FIG. 13 is a flow chart illustrating a functional testing method according to an embodiment of the present disclosure.

Please refer to FIG. 13, wherein FIG. 13 is a flow chart illustrating a functional testing method according to an embodiment of the present disclosure. The functional testing method shown in FIG. 13 is adapted to the device under test and may be performed by an apparatus connected to the functional testing module or performed by an apparatus directly connected to the device under test. In other words, the functional testing method may be performed by the BMC module, the main control module and the auxiliary module of one or more of the above embodiments, and is adapted to the functional testing device and the functional testing system of all of the above embodiments. The following describes the functional testing method with the functional testing system 3 of FIG. 12. The functional testing method includes: step S101: requesting a test script from a cloud database according to identification information of a device under test; and step S103: testing the device under test according to the test script.

In step S101, the main control module 313 requests the test script from a cloud database server (for example, the database server A1 of FIG. 3) through the input/output module 311 according to the identification information of the device under test. As described above, the method of the main control module 313 obtaining the identification information of the device under test may be through the scan device or through reading the read-only memory of the device under test. The test script includes different types of testing items, such as a testing item of testing PCIe function, a testing item of testing power function and a testing item of testing network connection etc.

In step S103, the main control module 313 performs testing on the devices under test 32*a* and 32*b* according to the test script. Take the device under test 32*a* as an example, the main control module 313 may output the corresponding testing signal(s) to the connection port 312*a* according to the test script to output testing signal(s) to the device under test 32*a*.

Further, also take the device under test 32*a* as an example, the implementation of step S103 may include the main control module 313 controlling the functional testing modules (for example, the functional testing modules 112*a* and 112*b* of FIG. 1) to perform testing on the device under test 32*a* according to the testing items of the test script, wherein each one of the functional testing modules may execute at least one of the testing items. In addition, the main control module 313 may output a plurality of control signals corresponding to the testing items to the functional testing modules in a time-division multiplexing manner, thereby controlling the functional testing modules to test the device under test 32*a*. In other words, the main control module 313 may control the functional testing modules to test the device under test 32*a* in a time-division multiplexing manner.

Figure 14:
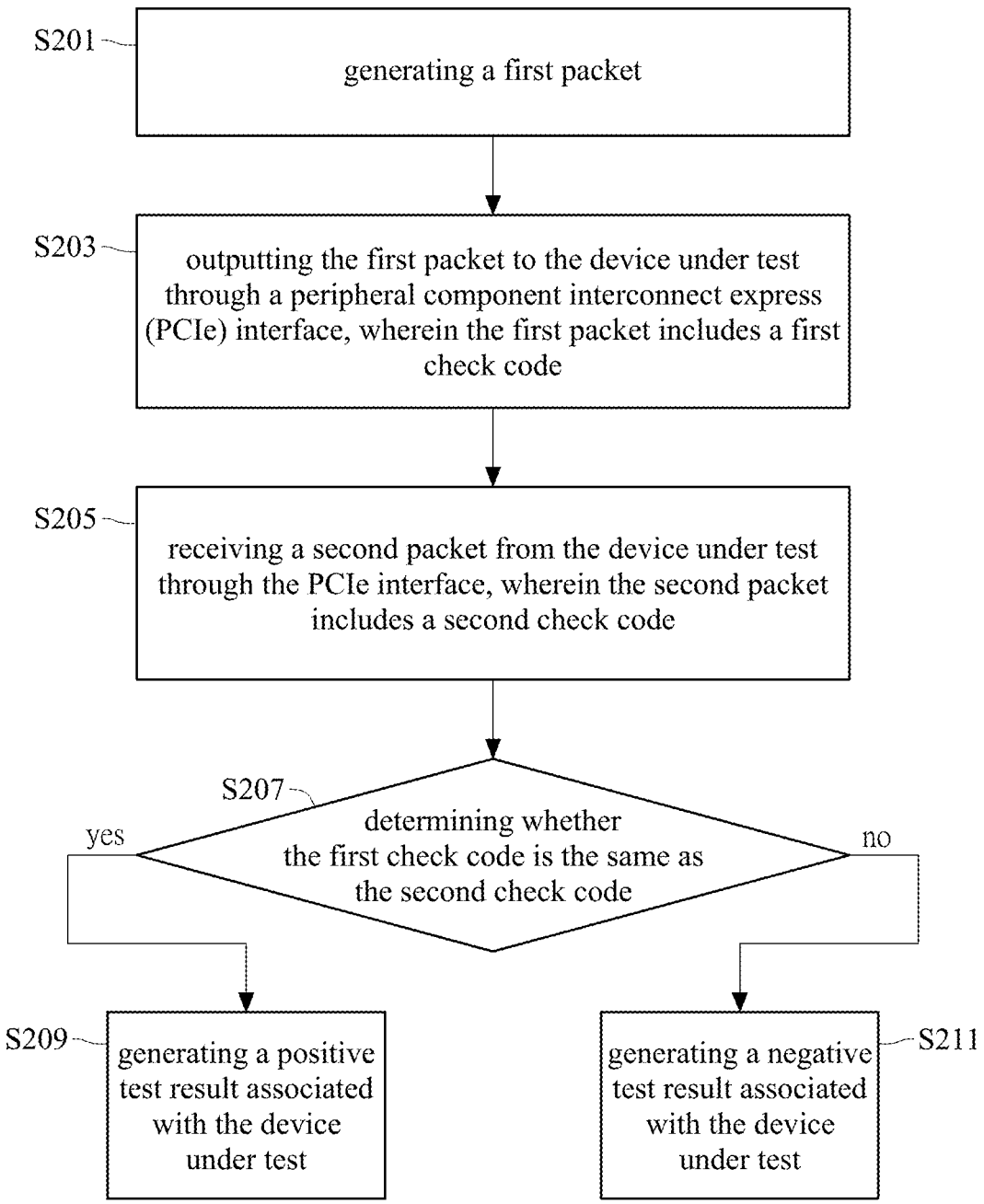
FIG. 14 is a flow chart illustrating testing a device under test according to an embodiment of the present disclosure.

Please refer to FIG. 14, wherein FIG. 14 is a flow chart illustrating testing a device under test according to an embodiment of the present disclosure. FIG. 14 may be regarded as a detail flowchart of an embodiment of step S103 of FIG. 13. The following also uses the functional testing system 3 and the device under test 32*a* as an example for description. The method of testing the device under test may include: step S201: generating a first packet; step S203: outputting the first packet to the device under test through a peripheral component interconnect express (PCIe) interface, wherein the first packet includes a first check code; step S205: receiving a second packet from the device under test through the PCIe interface, wherein the second packet includes a second check code; step S207: determining whether the first check code is the same as the second check code; when the determination result of step S207 is "yes", performing step S209: generating a positive test result associated with the device under test; when the determination result of step S207 is "no", performing step S211: generating a negative test result associated with the device under test.

In step S201, the first packet generated by the main control module 313 may be included in the testing signal. The first packet includes the first check code, wherein the first check code may be a cyclic redundancy check (CRC) function. In addition, the first packet may further include data such as a packet serial number etc., the present disclosure is not limited thereto.

In step S203, the main control module 313 outputs the first packet to the device under test 32*a* through a PCIe interface, wherein the PCIe interface may be the connection port 312*a*. Step S203 is equivalent to outputting the testing signals to the device under test through the connection port/the functional testing module described above.

In step S205, the main control module 313 receives the second packet from the device under test 32*a* through the same PCIe interface. The second packet includes the second check code, wherein the second check code may be a CRC function. In addition, the second packet may further include data such as a packet serial number etc., the present disclosure is not limited thereto.

In step S207, the main control module 313 determines whether the first check code and the second check code are the same. If the first check code and the second check code are the same, the main control module 313 determines that the device under test 32*a* passes the test and the main control module 313 performs step S209 accordingly to generate a positive test result associated with the device under test 32*a*. On the contrary, if the first check code and the second check code are not the same, the main control module 313 determines that the device under test 32*a* fails the test and the main control module 313 performs step S209 accordingly to generate a negative test result associated with the device under test 32*a*.

Figure 15:
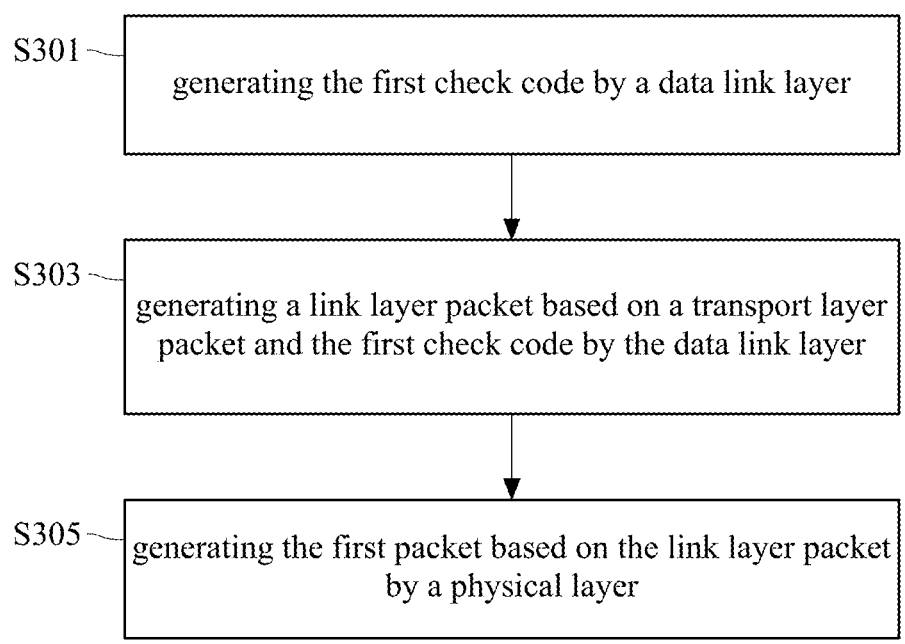
FIG. 15 is a flow chart illustrating generating a first packet according to an embodiment of the present disclosure.
Figure 16:
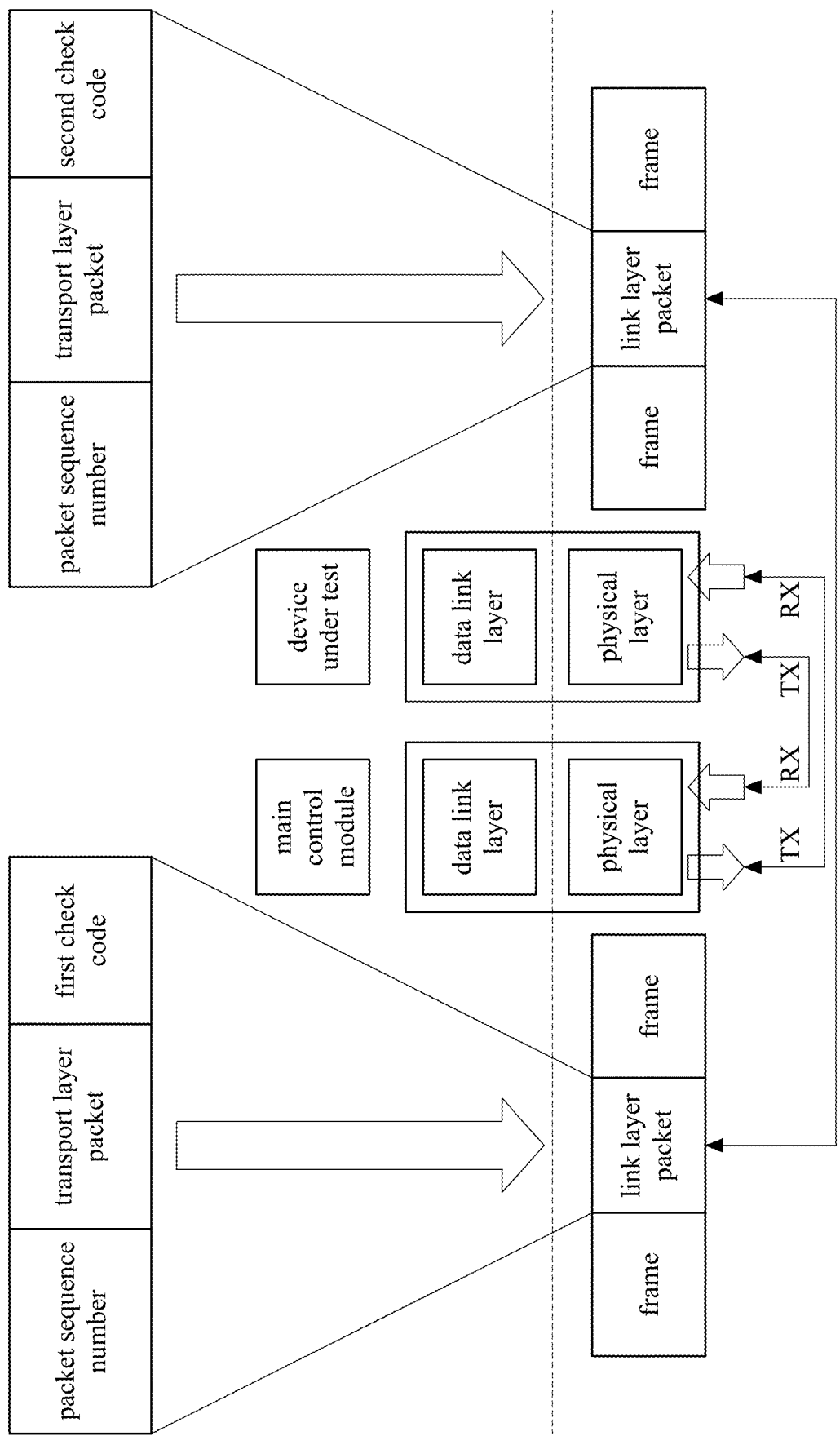
FIG. 16 is a schematic diagram illustrating functional testing method according to an embodiment of the present disclosure.

Please refer to FIG. 15 and FIG. 16, wherein FIG. 15 is a flow chart illustrating generating a first packet according to an embodiment of the present disclosure, and FIG. 16 is a schematic diagram illustrating functional testing method according to an embodiment of the present disclosure. FIG. 15 may be regarded as a detail flowchart of an embodiment of step S201 of FIG. 14. The following also uses the functional testing system 3 and the device under test 32*a* as an example for description. The method of generating the first packet includes: step S301: generating the first check code by a data link layer; step S303: generating a link layer packet based on a transport layer packet and the first check code by the data link layer; and step S305: generating the first packet based on the link layer packet by a physical layer.

In step S301, the data link layer of the main control module 313 generates the first check code. In step S303, the data link layer of the main control module 313 generates the link layer packet based on the transport layer packet and the first check code, wherein the transport layer packet (or referred to as "transaction layer packet") is generated by the transport layer (or referred to as "transaction layer") of the main control module 313. In other words, in step S303, the main control module 313 adds the first check code to the tail of the transport layer packet to generate the link layer packet, and the main control module 313 may add the packet serial number to the head of the transport layer packet.

In step S305, the physical layer of the main control module 313 generates the first packet based on the link layer packet. Further, the physical layer of the main control module 313 may add "start" to the head frame of the link layer packet and "end" to the end frame of the link layer packet to generate the first packet.

The device under test of the embodiments described above may be a motherboard, a power board, a PCIe interface, a network interface card, a graphics processing unit (GPU) card or a riser card etc., the present disclosure is not limited thereto.

In view of the above description, the functional testing device, system and method according to one or more embodiments of the present disclosure may perform various tests on one or more devices under test at the same time, thereby reducing time required to performing testing. In addition, the functional testing device, system and method according to one or more embodiments of the present disclosure may not require to perform testing through a mother board, testing cost may be reduced.

What is claimed is:

1. A functional testing device, comprising:
   a substrate;
   an input/output module disposed on the substrate and configured to receive a test script, wherein the input/output module comprises a communication port configured to connect a user interface to receive the test script from the user interface;
   a plurality of functional testing modules pluggably disposed on the substrate;
   a baseboard management control module disposed on the substrate and connected to the input/output module and the plurality of functional testing modules, the baseboard management control module configured to control the plurality of functional testing modules output a plurality of testing signals according to the test script; and
   a power module disposed on the substrate and configured to receive and transmit power to the plurality of functional testing modules and the baseboard management control module.

2. The functional testing device according to claim 1, wherein the baseboard management control module comprises:
   a first memory element;
   a second memory element configured to store a plurality of testing commands; and
   a control chip connected to the first memory element and the second memory element, the control chip configured to store the test script into the first memory element, read the test script in the first memory element and use at least a part of the plurality of testing commands according to the test script read from the first memory element to control the plurality of functional testing modules.

3. The functional testing device according to claim 1, wherein the input/output module is further configured to obtain identification information, and the baseboard management control module is further configured to request the test script corresponding to the identification information from a database server through the input/output module.

4. The functional testing device according to claim 1, wherein the baseboard management control module comprises an expansion board and a connection port, the connection port is disposed at the expansion board, and the baseboard management control module is connected to the input/output module, the plurality of functional testing modules and the power module through the connection port.

5. The functional testing device according to claim 1, wherein the input/output module further comprises:
   a first communication port configured to connect a database server; and
   a second communication port configured to connect a scan device to obtain identification information from the scan device;
   wherein the baseboard management control module is further configured to request the test script according to the identification information from the database server through the first communication port.

6. The functional testing device according to claim 5, wherein the first communication port is RJ45, and the second communication port is a universal serial bus interface.

7. The functional testing device according to claim 1, wherein the communication port is one of a universal serial bus, RJ45 and RS485.

8. The functional testing device according to claim 1, wherein the input/output module further comprises;
   a first communication port configured to connect a database server; and
   a second communication port configured to read identification information;
   wherein the baseboard management control module is further configured to request the test script according to the identification information from the database server through the first communication port.

9. The functional testing device according to claim 1, wherein the plurality of functional testing modules are disposed on the substrate through a peripheral component interconnect express connection port.

* * * * *